United States Patent [19]

Tachi

[11] 4,134,130
[45] Jan. 9, 1979

[54] METHOD AND APPARATUS OF INSERTING AN ADDRESS SIGNAL IN A VIDEO SIGNAL

[75] Inventor: Katsuichi Tachi, Kawasaki, Japan

[73] Assignee: Sony Corporation, Tokyo, Japan

[21] Appl. No.: 819,172

[22] Filed: Jul. 26, 1977

[30] Foreign Application Priority Data

Jul. 30, 1976 [JP] Japan .............................. 51-91878
Jul. 30, 1976 [JP] Japan .............................. 51-91879
Jul. 31, 1976 [JP] Japan .............................. 51-91551

[51] Int. Cl.² .............................................. H04N 7/08
[52] U.S. Cl. .................................................. 358/147
[58] Field of Search ............................ 358/147, 4, 8

[56] References Cited

U.S. PATENT DOCUMENTS 3,493,674   2/1970   Houghton ............................ 358/147

Primary Examiner—Richard Murray
Attorney, Agent, or Firm—Hill, Gross, Simpson, Van Santen, Steadman, Chiara & Simpson

[57] ABSTRACT

Method and apparatus for inserting an address signal in a video signal by compressing the SMPTE (Society of Motion Picture And Television Engineers) time code signal and then inserting the compressed time code signal into three successive vertical blanking periods of the video signal. The invention allows the time code signals to be reconstructed where the record medium is stopped or transported at very low speeds.

6 Claims, 8 Drawing Figures

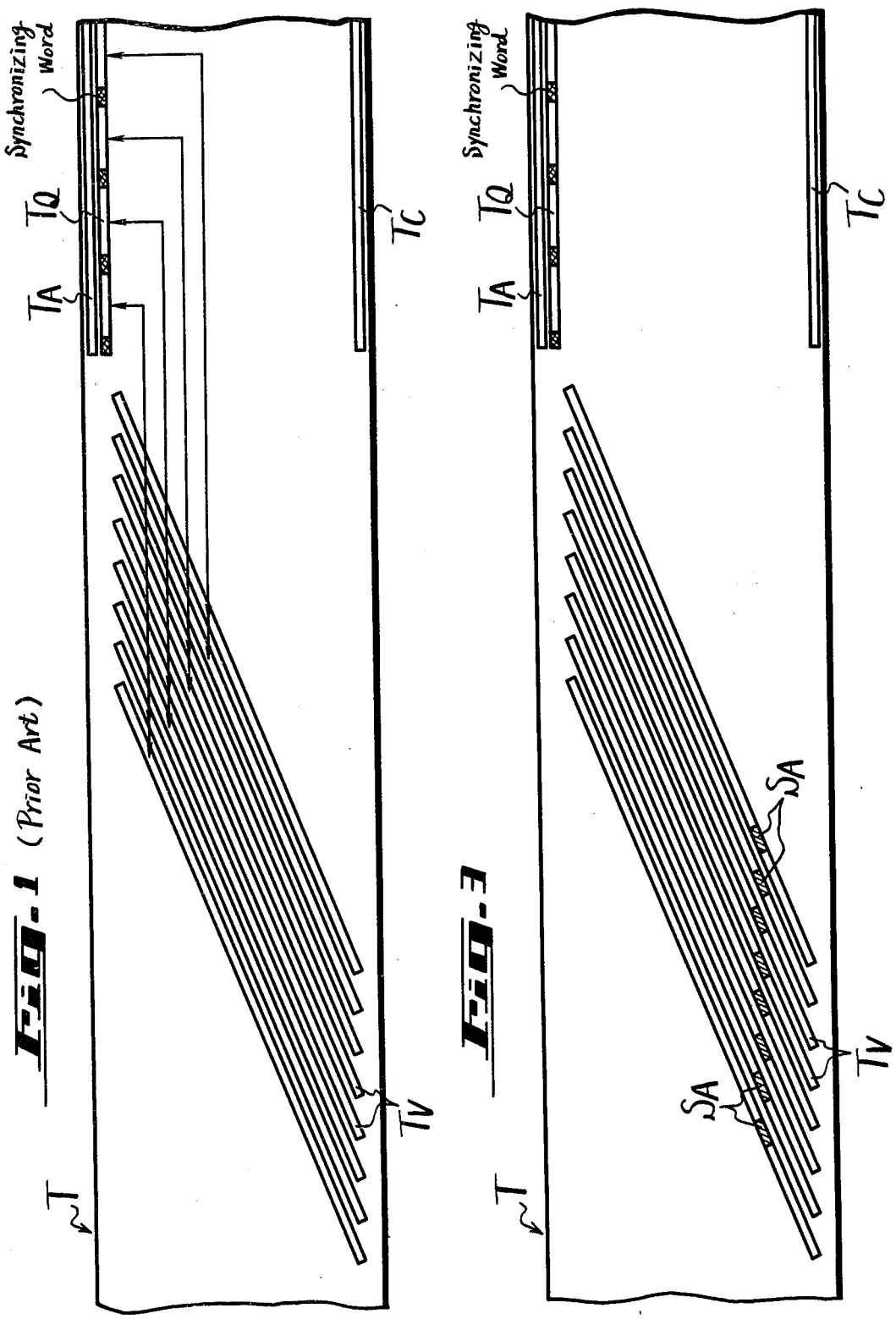

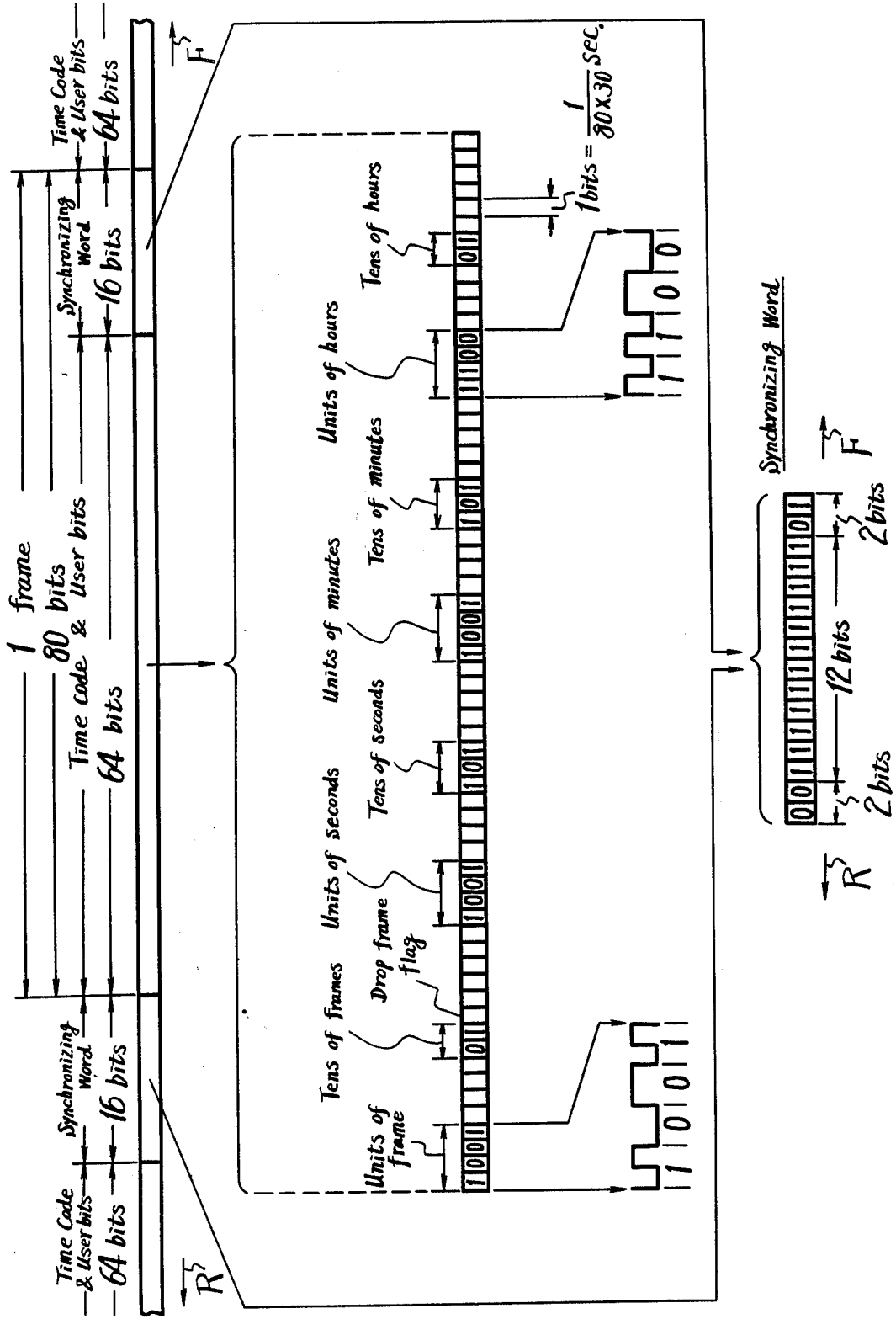

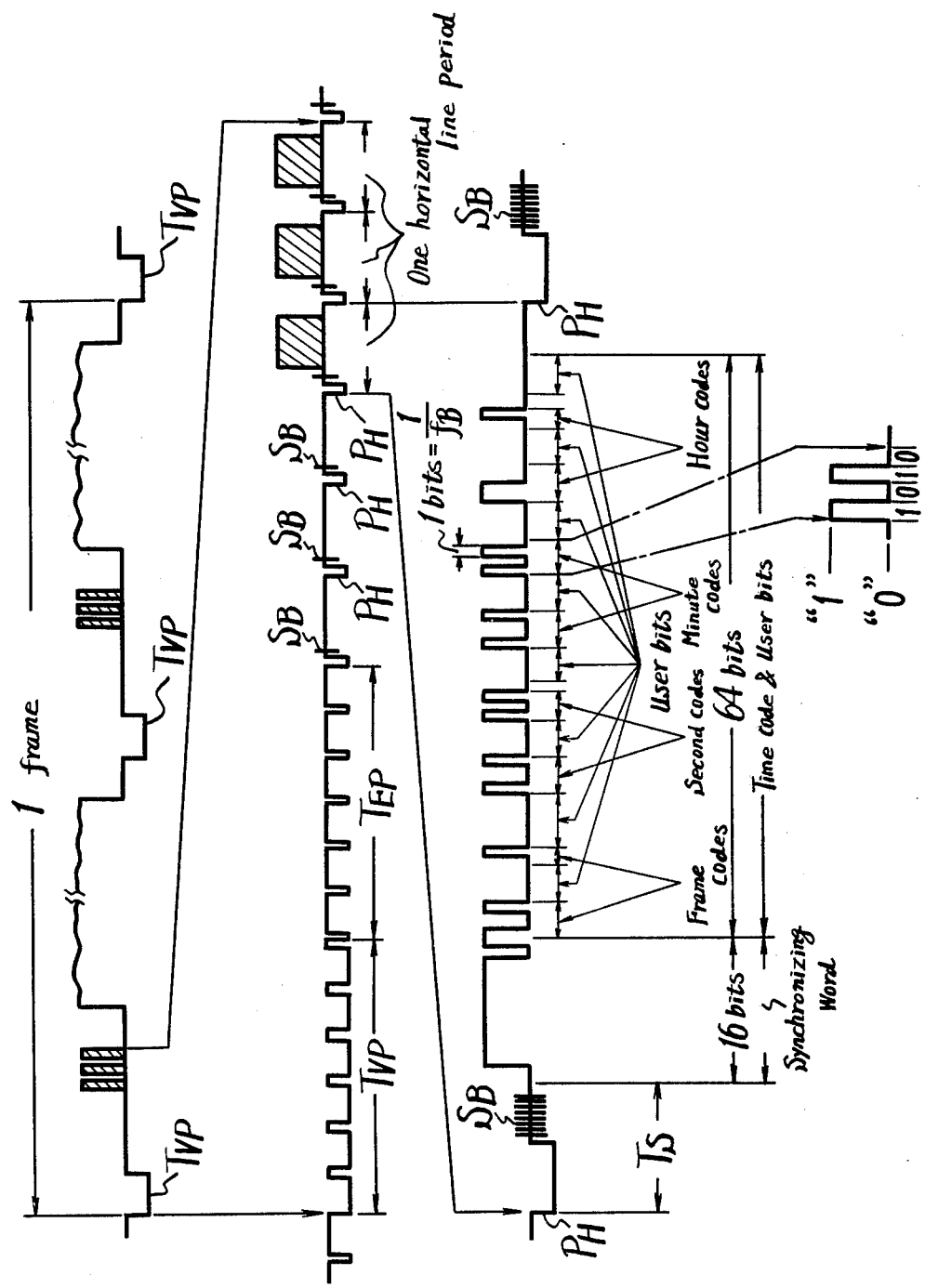

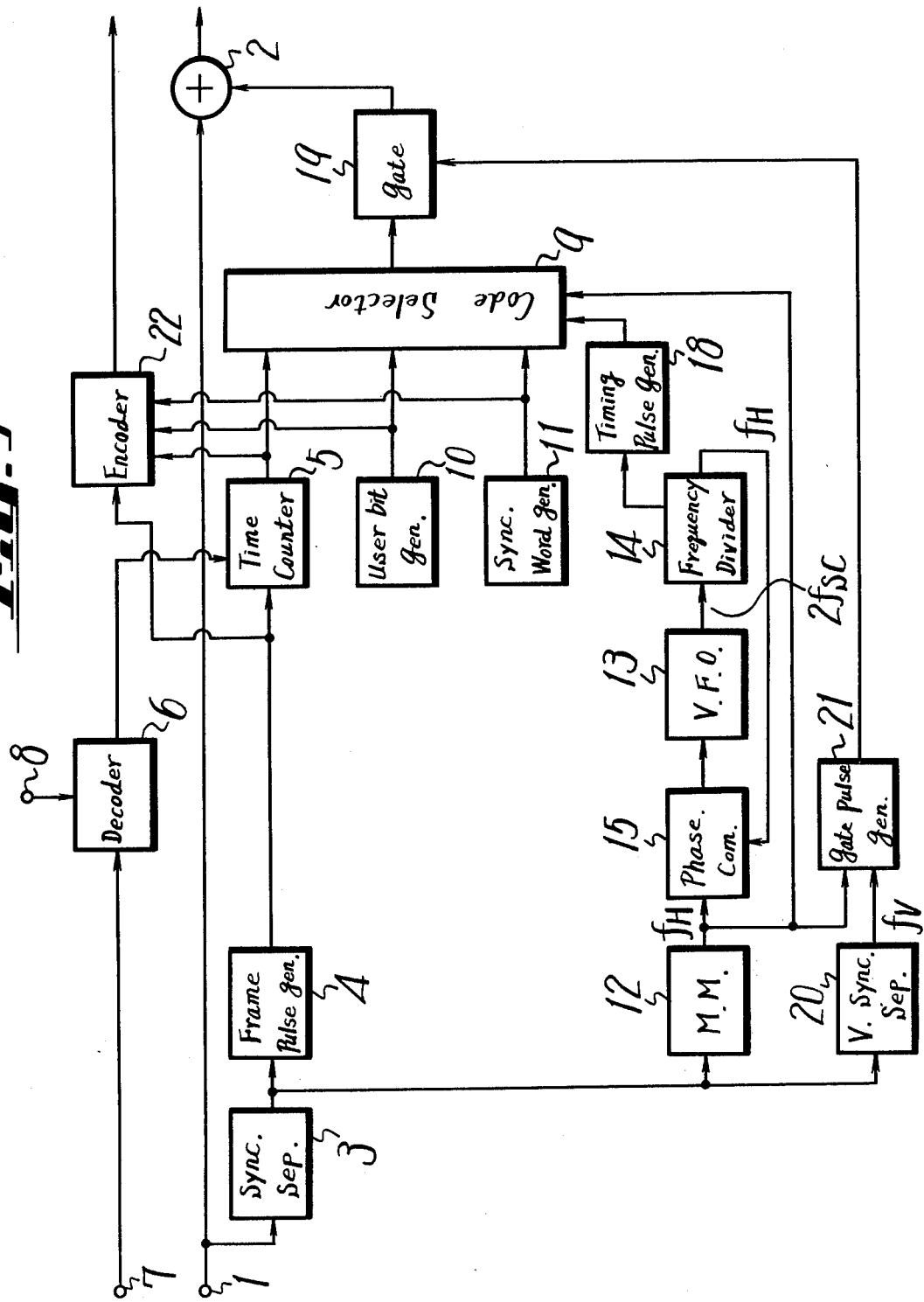

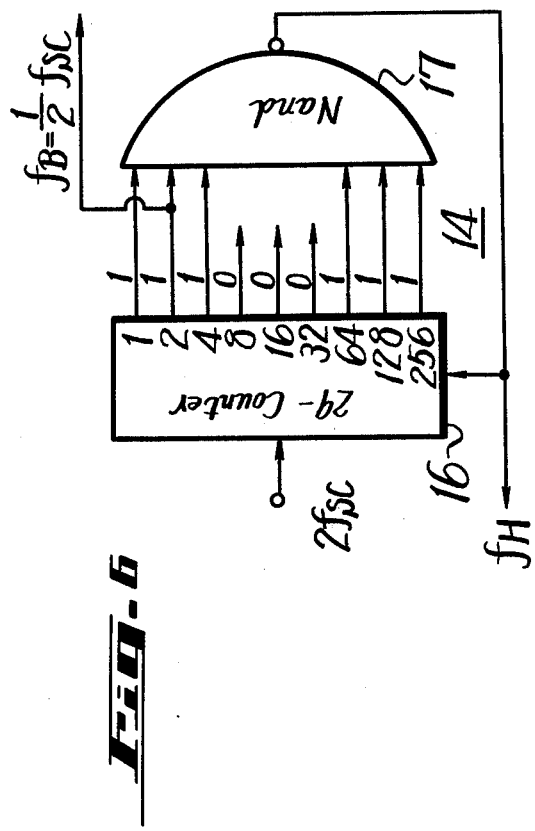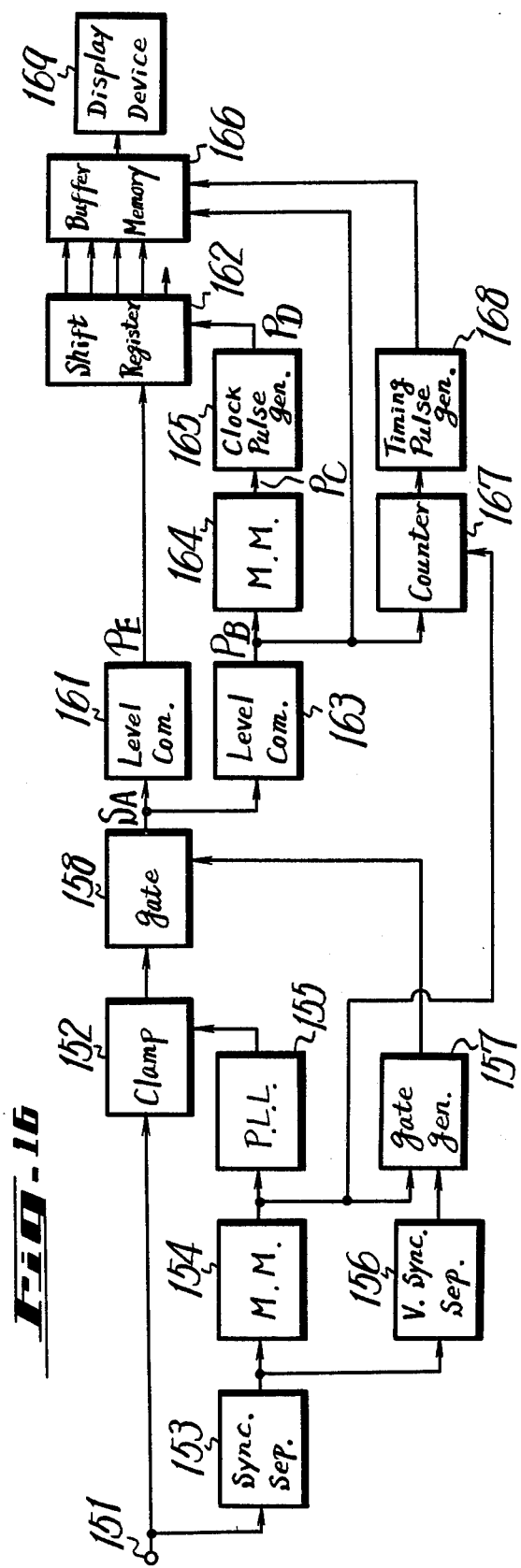

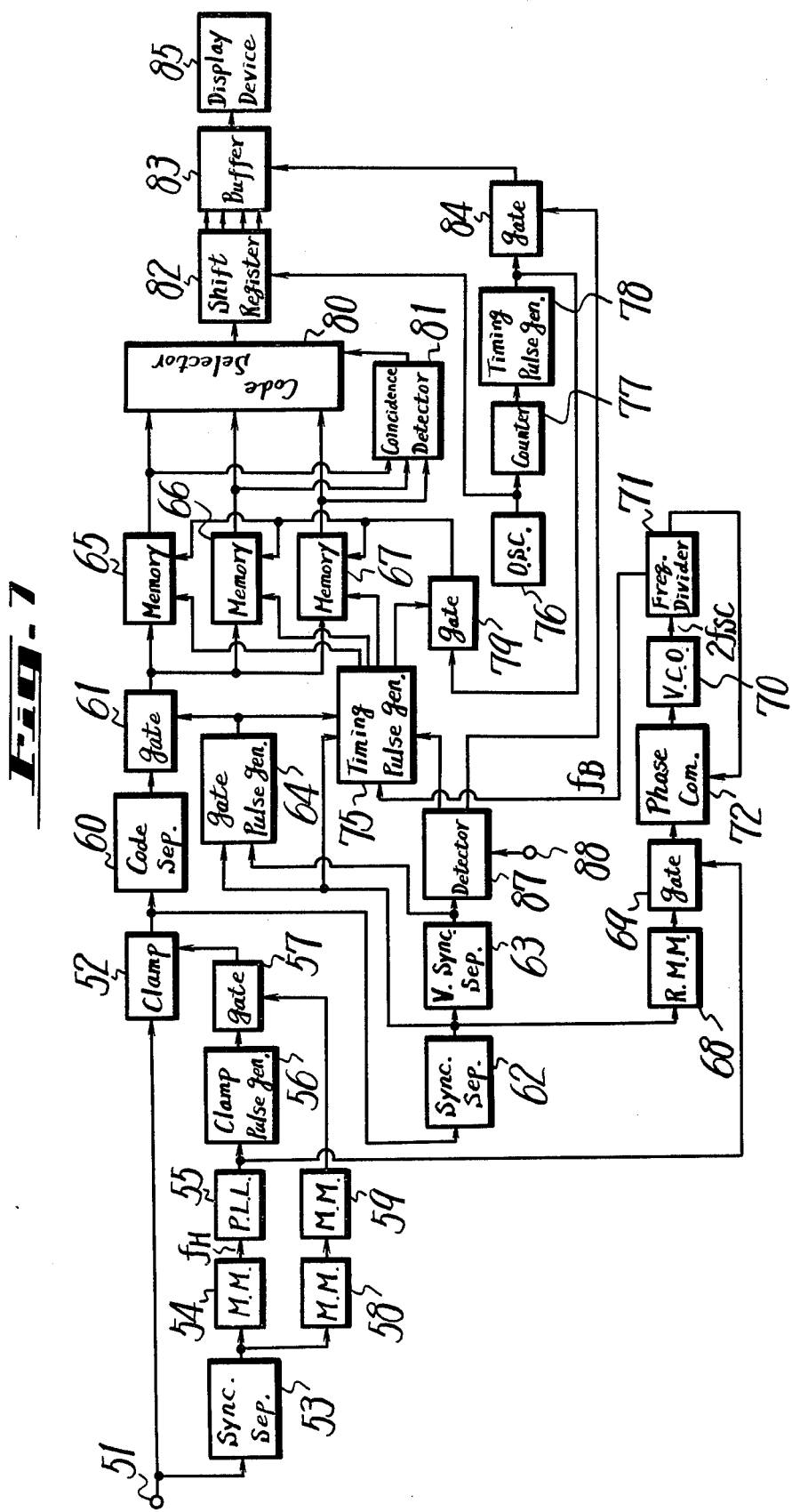

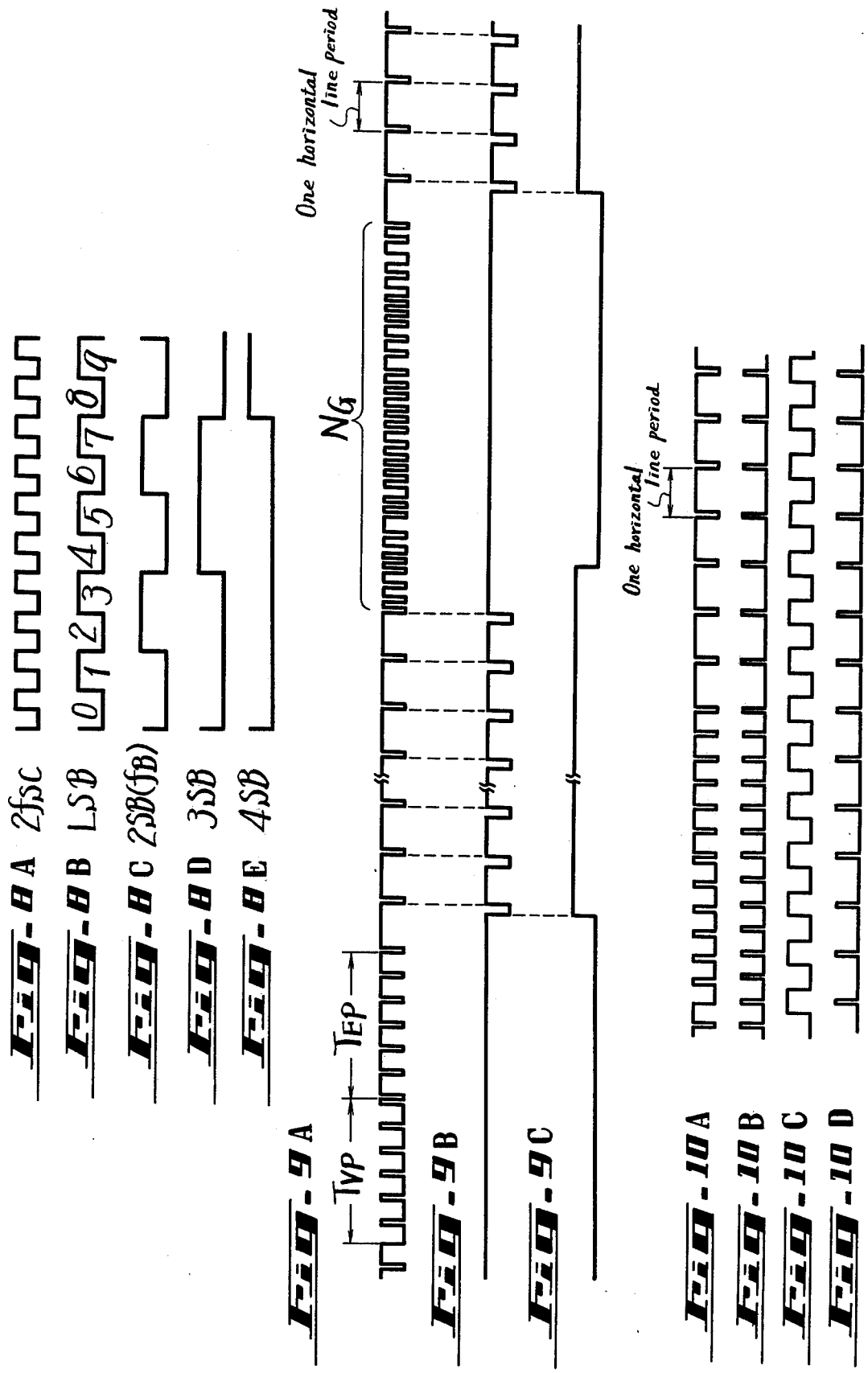

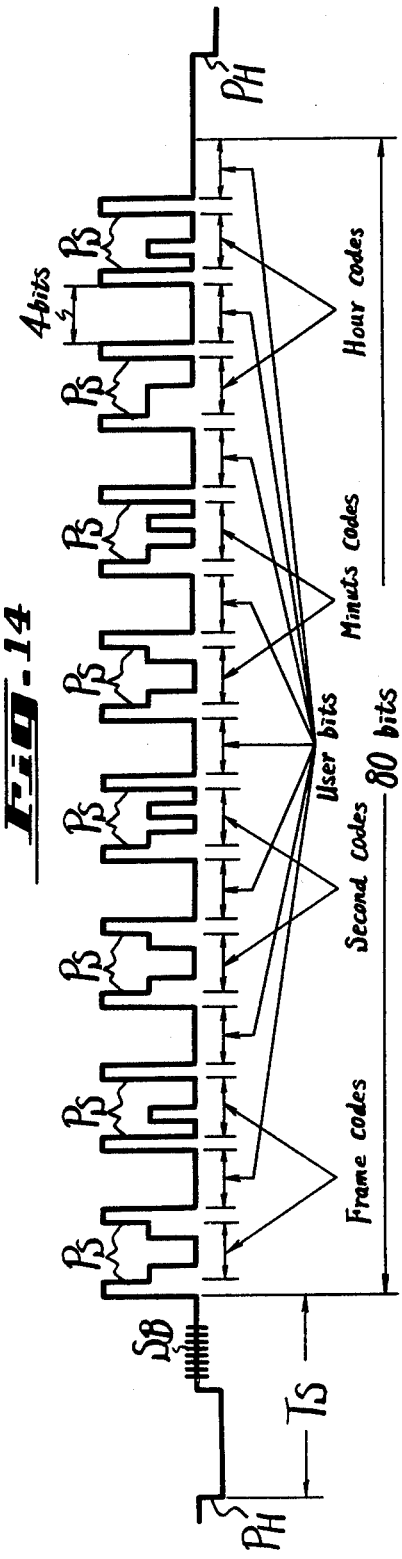
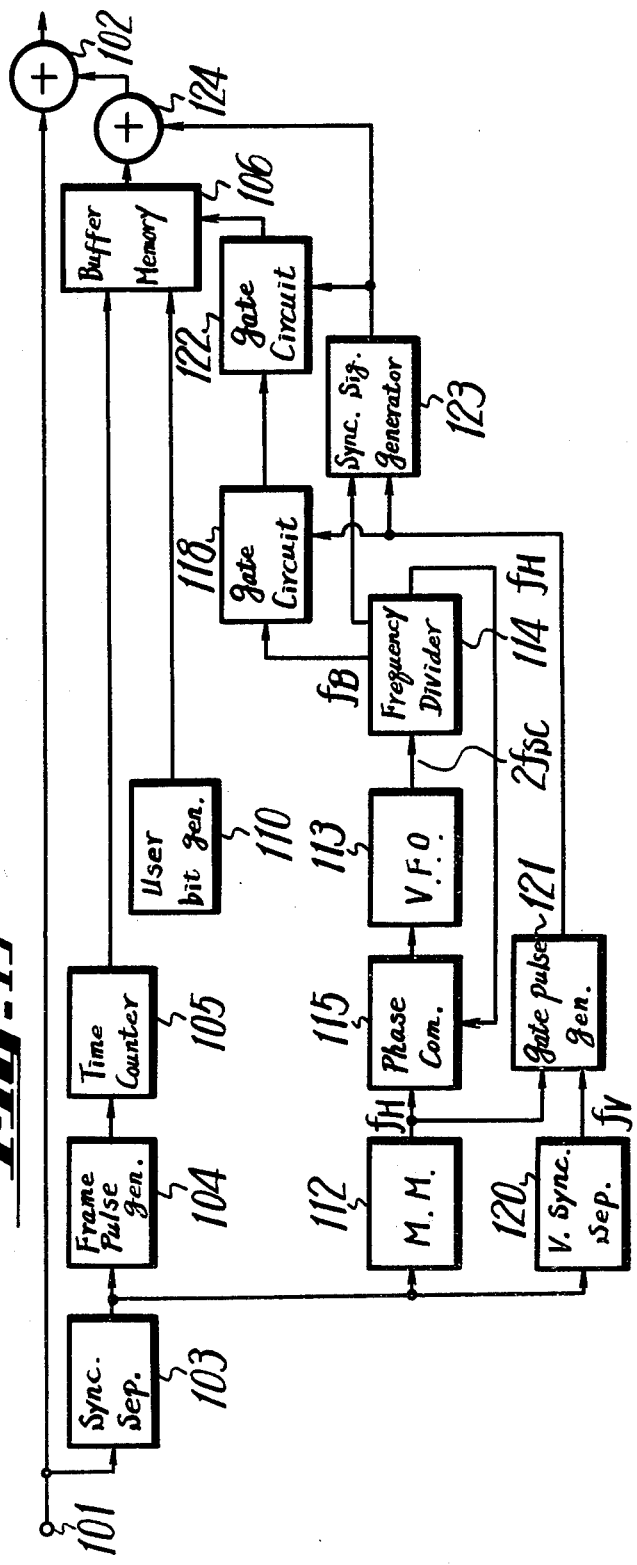

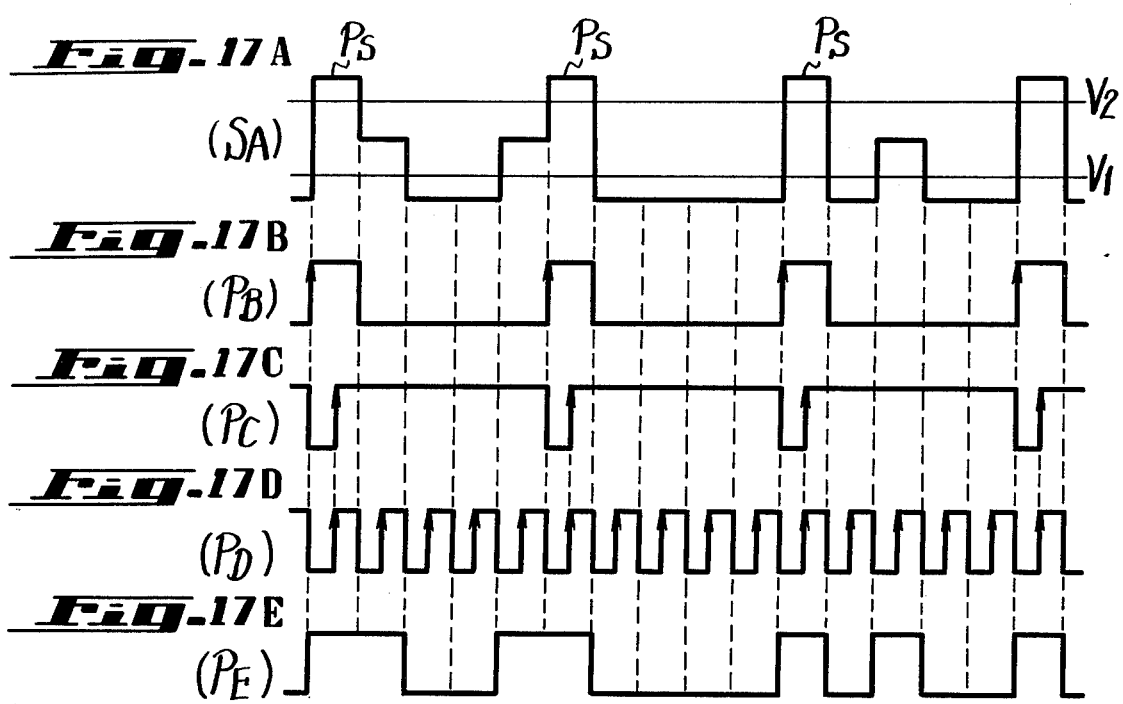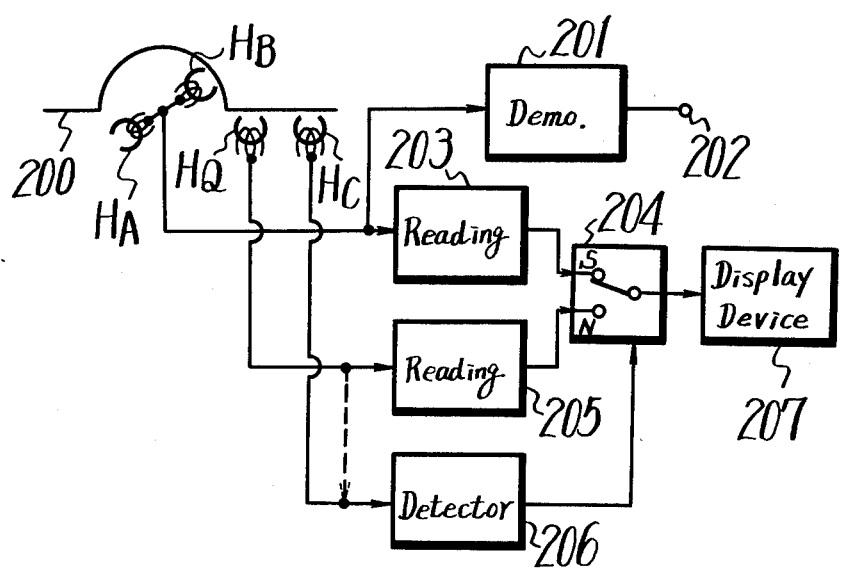

METHOD AND APPARATUS OF INSERTING AN ADDRESS SIGNAL IN A VIDEO SIGNAL

BACKGROUND OF THE INVENTION

1. Field of the Invention

This invention relates in general to a method and apparatus for inserting address signals in a video signal for a video tape apparatus.

2. Description of the Prior Art

In order to edit video and/or audio signals rapidly and precisely, it has been proposed in the prior art to record an address signal on the magnetic tape in addition to the video and/or audio signal. In this case, as the address signal are provided signals of various codes, but the SMPTE time code signal is recommended as an American National Standard and the EBU time code signal is recommended as a standard code for 625 line/50 field television tape recordings. In the art, the above two time code signals are recorded on a record medium along its longitudinal track and read out of the signals can be achieved at tape speeds from slow to high speed. In the case where the record medium is stopped or transported at very low speeds however, the reproduction of the time code signals becomes impossible. In fact upon editing a video tape by a video tape recorder, it is very advantageous for an editor to be able to choose individual frames presented visually at very low tape speeds but the disadvantages of this method of operation is that the address of a chosen frame cannot be readily known with prior art systems.

The time code signals identify each television frame but the identification of its even or odd field and that of the phase of the burst signal of each television field are impossible. Therefore, precise editing cannot be achieved by the known prior art systems.

In a video tape recorder having a still reproduction mode, in order to obtain an address signal in the still reproduction mode, it has been proposed to convert the synchronizing signal in the vertical blanking period of a television signal to a signal corresponding to an address. For example, Japanese Patent Publication No. 42/4540 filed by Nippon Hoso Kyokai published on Feb. 24, 1967 discloses this method. This Japanese Patent Publication discloses an address signal including frame identification that can be reproduced even in a still reproduction mode but since there is no ordinary synchronizing pulse in the vertical blanking period, a special processing is necessary so as to supply the reproduced address signal to other video tape recorders (VTRs) and a time base corrector.

In these prior art devices since one address signal is recorded for each frame reading errors caused by dropouts or guard band noise during reproduction cannot be prevented.

SUMMARY OF THE INVENTION

It is an object of this invention to provide a method of inserting an address signal in the vertical interval of a video signal.

Another object of the invention is to provide a method of recording an address signal which prevents reading errors.

A further object of the invention is to provide a method of recording an address signal which is suitable for a helical scan video tape recorder.

A still further object of the invention is to provide a circuit which can read out an address signal without errors.

A yet further object of the invention is to provide a circuit which derives an address signal from a video tape recorder independent of tape speeds.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a top plan view of a part of a magnetic tape on which a video signal is recorded as slant tracks and an address signal is also recorded by a prior art method, FIG. 2 is a schematic diagram illustrating the SMPTE time code signal which is recorded on the tape, FIG. 3 is a top plan view of a part of a magnetic tape on which a video signal and address signal are recorded by the method of the invention;

FIG. 4 is a diagram illustrating a recorded pattern of signals on a tape according to the invention, FIG. 5 is a block diagram illustrating a circuit according to the invention which is to be used to produce VITC signals and record them on a magnetic tape, FIG. 6 is a diagram showing a practical example of the frequency divider illustrated in FIG. 5, FIG. 7 is block diagram illustrating a circuit of the invention for reading out the VITC signals from a magnetic tape and decode the address, FIG. 8 illustrates waveform diagrams used for explaining the operation of the circuit shown in FIG. 5, FIGS. 9A through 9C as well as FIGS. 10A through 10D are waveform diagrams useful for explaining the operation of the circuit shown in FIG. 7, FIGS. 11, 12 and 13 are schematic diagrams used for explaining guard band noise, FIG. 14 is a waveform diagram showing a modified address signal which modifies a portion of that shown in FIG. 4, FIG. 15 is a block diagram comprising an example of the circuit of the invention which forms the address signal shown in FIG. 14, inserts the address signal in a horizontal line period of a video signal and records the signal, FIG. 16 is a block diagram showing the example of the circuit for reading out only the address signal shown in FIG. 14 from the video track and display the address, FIGS. 17A through 17E are waveform diagrams useful for explaining the circuit illustrated in FIG. 16, and FIG. 18 is a block diagram illustrating an example of the circuit of the invention which makes it possible to display an address of a video signal always correctly independent of the tape speed.

DESCRIPTION OF THE PREFERRED EMBODIMENTS

Figure 11:
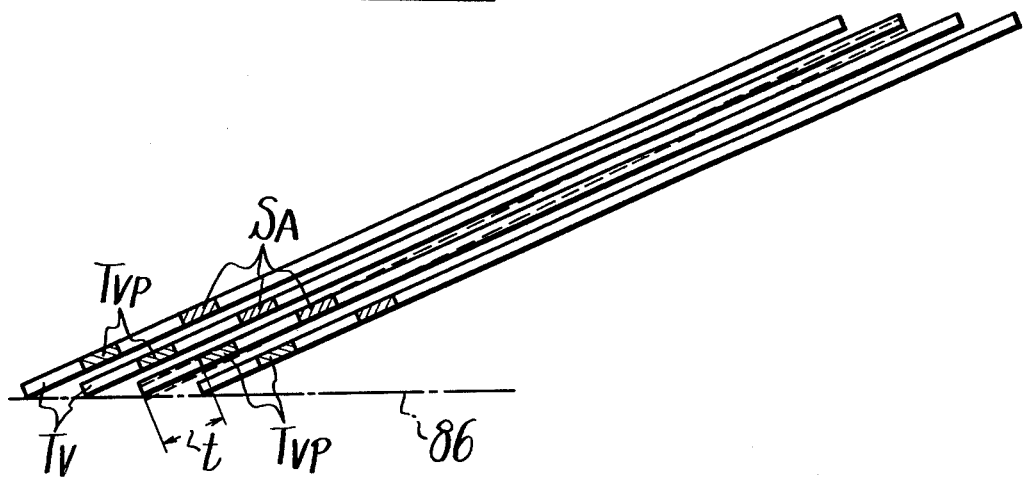

FIG. 1 illustrates a prior art method of recording an address signal on a magnetic tape comprising a magnetic tape T upon which an address signal is recorded in addition to a video signal.

In FIG. 1, $T_V$ represents a number of video tracks formed on a magnetic tape T and each of the video tracks $T_V$ includes a video signal of one field. $T_A$ designate a track on the tape T which carries the audio signal. Track $T_Q$ represents the track which carries the cue signals and $T_C$ designates a track which carry the control signals. On the cue track $T_Q$ is recorded an address signal. In this case, a SMPTE time code signal is used as the address signal and two video tracks $T_V$ which form one frame are identified by one SMPTE time code signal.

The SMPTE time code is approved as the American National Standard time and control code for video and audio tape for 525 line/60 field television systems on Apr. 2, 1975 and published in the journal of the SMPTE Volume 84, July 9, 1975.

As shown in FIG. 2, which schematically illustrates the SMPTE code signal, each address corresponds to one frame and consists of 80 bits numbered 0 through 79 and the bit frequency is selected as 2.4 KHz. As illustrated in FIG. 2, time address bits consisting of 26 bits indicate 29 frames, 59 seconds, 59 minutes and 23 hours. The bit number 10 is the drop frame flag, the bit numbers 11, 27, 43, 58 and 59 are unassigned address bits and the bit numbers 4 through 7, 12 through 15, 20 through 23, 28 through 31, 36 through 39, 44 through 47, 52 through 55 and 60 through 63 are user bits, respectively. The synchronizing word of 16 bits is arranged such that it is discriminated whether the tape is transported in the forward direction and, thus, the SMPTE time code signal when read out in the direction indicated by an arrow F or when the tape is transported in the backward direction and hence the SMPTE time code signal is read out in the direction indicated by an arrow R. Thus, the time code signal can be correctly read out even if the tape is transported in either direction. In this case, the code signal is so recorded that the information "1" and "0" thereof are recorded as bi-phase mark as illustrated in FIG. 2.

As described above, if the address signal for each frame of the video signal is recorded on the track $T_Q$ which extends in the lengthwise direction of the tape T editing of the tape can be accomplished very rapidly and precisely.

However, in the case of slow or still motion reproduction mode, the speed of the tape becomes very slow or the tape is actually stopped so that the code signal recorded on the track $T_Q$ cannot be read out.

FIGS. 3 through 13 illustrate an example of the invention which provides an address signal that can be read out even in slow or still reproduction modes and, thus, editing of a tape can be efficiently accomplished. The video signal of the NTSC system is used as an example.

FIG. 3 is a top plan view of magnetic tape T on which the video signal and address signals are recorded by the method and apparatus of the invention.

With the invention, an address signal $S_A$ identifying a video signal corresponding to each $T_V$ track is inserted in the video signal as a digital signal and the video signal each of which includes the address signal $S_A$ are recorded on the tape as slant tracks $T_V$. The address signals $S_A$ recorded on the video tracks $T_V$ are indicated as hatched areas in FIG. 3. The address signals $S_A$ are inserted into the video signals of odd and even fields of one frame and then recorded as shown in FIG. 3.

As shown with hatches in FIG. 4 which comprises a record pattern of signals on the tape, not shown, according to the invention, one address signal is inserted into one horizontal line period in the suppressed line period within the vertical blanking period or vertical interval excepting that portion which comprises a vertical synchronizing pulse period $T_{VP}$ and equalizing pulse period $T_{EP}$. The address signal is inserted in the period after burst signals $S_B$ and it is desired that the same address signals be inserted repeatedly into three successive horizontal line periods. Hereinafter this address signal will be referred to simply as the VITC (vertical interval time code) signal. The above suppressed periods correspond to the 10th through 21st line periods in the NTSC system.

The code of the VITC signal consists of, for example, 80 bits similar to the SMPTE time code signal illustrated in FIG. 2 and its bit frequency $f_B$ is selected as the color subcarrier frequency $f_{SC}$ which equals 3.58 MHz divided by an integer, for example, one half (½) of the frequency $f_{SC}$. If the horizontal line frequency is taken as $f_H$ and the vertical frequency as $f_V$, respectively, the following relationship is established:

$$f_{SC} = (455/2)f_H = (455 \times 525/4)f_V \qquad (1)$$

Thus, if the following relationship is established:

$$f_B = (½)f_{SC} \qquad (2)$$

and the following equation 3 is obtained:

$$f_B = (455/4)f_H \qquad (3)$$

Thus, 80 bits of the VITC signal can be inserted into one horizontal line.

In 80 bits, 32 bits are address bits, another 32 bits are user bits and the remaining 16 bits are synchronizing words respectively. The arranged relationship between the address bits and user bits could be the same as that of the SMPTE time code signal shown in FIG. 2 and the address bits inserted in odd and even fields of the same frame are selected to have the same code. The sync words are located at the head of the VITC signal or immediately after the burst signal $S_B$. As mentioned above, the sync words having the same code as that of the SMPTE time code signal shown in FIG. 2 could be sufficient, but they are recorded on the video track and, hence, the reading direction of the code signal is constant regardless of the tape transporting direction. Therefore, they could be in entirely different types of code. For example, they could be changed to the start codes of the VITC signal and the field identification code to identify the odd field and the even field. Also, the field identification could be accomplished by making the bit number 11 be "0" or "1". As is apparent from equation (1), since the phase of the color subcarrier relative to the vertical synchronizing signal varies with four fields as one period, the above code can be changed to the burst phase identification code for identifying the four fields. Furthermore, it is desirable that whether the total number of bits to which "one" of the VITC is assigned, is odd or even numbered that a suitable bit in the sync words be changed to "0" or "1" so as to make the number of bits to which the "1" is assigned be, for example, odd. Thus, when the VITC signal is read out if a whole number of "1" is counted and it is determined whether the total counted number of "1" is odd or even, it can be determined whether the correct code signal has been read out or not. The position of the head of the sync word, in other words, the position of the start of the VITC signal, is always selected at a constant time $T_S$ from the horizontal synchronizing pulse $P_H$.

In this case, it is sufficient that the informations "1" and "0" of the VITC signal are expressed as different levels as shown in FIG. 4. For example, information "0" is selected as the pedestal level and the information "1" is selected as 50 IRE units or a signal higher than the "0" level and then the signals are recorded with opposite level to the horizontal synchonizing pulse viewed from the pedestal level.

FIG. 5 illustrates a circuit for producing the VITC signal and for recording the same on a magnetic tape.

In FIG. 5, an input terminal 1 receives a video signal which is to be recorded. The video signal is fed to an adder 2 and also to a synchronizing signal separator 3 from which a vertical interval signal including an equalizing pulse is derived. This vertical interval signal is supplied to a frame pulse generator 4 which produces a frame pulse and supplies it to a time counter 5. The time counter 5 is supplied with the output signal of a decoder 6 for presetting it at a predetermined address code. When no SMPTE time code signal described in connection with FIG. 2 is applied to an input terminal 7 as, for example, when such signal is derived as a signal from a master tape upon which the SMPTE time code signal is recorded and is edited to a slave tape, an external switching signal is applied at input terminal 8 to decoder 6 which then produces a preset signal based upon the SMPTE time code signal. Thus, time counter 5 is preset at the time code which is the same as the time code which is given to the address bits of the SMPTE time code signal. In this case, since the SMPTE time code signal is read out from the master tape which is moved, when the address read out in the master tape is recorded on the slave tape, the address will be displaced by one. Therefore, it is necessary that a time code to be preset should be a code of a read out address plus one frame. When no SMPTE time code signal is supplied to the input terminal 7, if an interval switching signal is applied to terminal 8, decoder 6 produces a preset signal which is internally formed by a signal key-input to decoder 6. Thus, the time counter 5 is preset at the time code corresponding to the key input signal. The time code of 32 bits from time counter 5 is fed to a code selector 9. In this example, the time code implies a code which consists of an address of 32 bits including drop frame flag and unassigned address bits. The user portion of 32 bits from a user bit generator 10 and the sync words of 16 bits from a sync word generator 11 are also fed to code selector 9.

The vertical interval signal from synchronizing signal separator 3 is also fed to a monostable multivibrator 12 from which the horizontal synchronizing signal with the exception of the equalizing pulse is derived. The signal from a variable frequency oscillator 13 is supplied to a frequency divider 14 which divides it by 455. A phase comparator 15 receives the horizontal synchronizing pulse from multivibrator 12 and the frequency divided signal from frequency divider 14 which are compared in phase therein. The phase compared error difference voltage from the phase comparator 15 is fed to the variable frequency oscillator 13 to control its frequency. The output frequency of oscillator 13 is selected as 455 times $f_H$, in order words, $2f_{SC}$ and hence frequency divider 14 produces a signal of the horizontal frequency $f_H$. The frequency divider 14 produces at its other output terminal a clock pulse synchronized with the horizontal synchronizing signal or with the frequency of $f_B = \frac{1}{2} f_{SC}$.

FIG. 6 illustrates a practical embodiment of the frequency divider 14. The frequency divider 14 comprises a $2^9$ scale counter 16 and a NAND circuit 17. The pulse having a frequency of $2f_{SC}$ from oscillator 13 is fed to the $2^9$ scale counter 16 and is then frequency divided as illustrated in FIG. 8. That is to say, when the outputs of 3 bits from the last and 3 bits from the start become "1" or 455 pulses with the frequency of $2f_{SC}$ are counted, the output of NAND circuit 17 becomes "0". The output of NAND circuit 17 is supplied to counter 16 so that at this time the counter 16 will be reset. As a result, the output from counter 16 at the second from the last position becomes a pulse with the frequency of $f_B = \frac{1}{2} f_{SC}$.

As shown in FIG. 5, the pulse of the frequency $f_B$ from counter 16 is applied to a timing pulse generator 18 which produces a timing pulse which has the same frequency as $f_B$. The timing pulse from generator 18 is supplied to code selector 9 which also receives the horizontal synchronizing pulse from monostable multivibrator 12. Thus, the code selector 9 produces a code signal in which the sync word bits, time code bits and user bits are arranged in each horizontal line period as shown in FIG. 4. The code signal from code selector 9 is fed to a gate circuit 19. The vertical interval signal from synchronizing signal separator 3 is further supplied to a vertical synchronizing signal separator 20 from which the vertical synchronizing signal is derived. This vertical synchronizing signal and the horizontal synchronizing signal from monostable multivibrator 12 are applied to a gate pulse generator 21. The gate pulse derived therefrom is fed to gate circuit 19. Thus, the code signal consisting of 80 bits could be inserted into three successive horizontal line periods within the vertical blanking period of the video signal and hence the VITC signal is obtained. The VITC signal from gate circuit 19 is applied to the adder 2 and added therein to the video signal. The video signal including VITC signal from adder 2 is fed to a rotary magnetic head (not shown) and there recorded on magnetic tape T as slant tracks $T_V$ as illustrated in FIG. 3.

Also, the time code of 32 bits from the time counter 5, the user bits of 32 bits from the user bit generator 10 and the sync words of 16 bits from the sync word generator 11 are also supplied to an encoder 22 which is also supplied with the frame pulse from frame pulse generator 4. Thus, encoder 22 produces a SMPTE time code signal at every frame which is similar to that shown in FIG. 2. This SMPTE time code signal from encoder 22 is fed to a fixed magnetic head (not shown) and recorded by the head on tape T as the track $T_Q$ which extends in the longitudinal direction of the tape T along its one edge as shown in FIG. 3.

As an example of the circuit which will read out the VITC signal from the video signal recorded on track $T_V$ and display the address reference may be made to FIG. 7. Input terminal 51 receives a video signal produced by a rotary magnetic head (not shown) from track $T_V$. The reproduced video signal supplied to terminal 51 is then supplied to a clamp circuit 52 and also too a synchronizing signal separator 53 from which the vertical interval signal or composite synchronizing signal including the VITC signal can be derived. This vertical interval signal is then fed to a monostable multivibrator 54 which produces the horizontal synchronizing pulse except for the equalizing pulse. This horizontal synchronizing pulse is fed to a phase synchronized circuit or so-called phase lock loop (PLL) circuit 55 from which a pulse synchronized with the horizontal synchronizing pulse is derived. The pulse from PLL circuit 55 is supplied to a clamp pulse generator 56. The pulse generator 56 produces a clamp pulse which would pedestal clamp the reproduced video signal. This is the clamp pulse which is fed to a gate circuit 57.

The composite synchronizing signal from synchronizing signal separator 53 is also supplied to a retriggerable monostable multivibrator 58 whose output pulse is supplied to another retriggerable monostable multivibrator 59. The pulse derived from multivibrator 59 is fed to gate circuit 57. The multivibrator 58 is formed such that it holds its quasi-stable state for a period a little shorter than one horizontal line period whereas the multivibrator 59 is formed such that it holds its quasi-stable state for a period a little longer than one horizontal line period.

As will be described later in the case of slow motion or still motion reproduction modes, a guard band noise signal is present in a reproduced video signal and, hence, a guard band noise $N_G$ is present in the composite synchronizing signal as illustrated in FIG. 9A. Thus, within the intervals except for the period $T_{VP}$ of the vertical synchronizing pulse, periods $T_{EP}$ of equalizing pulses before and after period $T_{VP}$ and the period where guard band noise $N_G$ exists, the output of the monostable multivibrator 58 is a pulse of the horizontal frequency $f_H$ as shown in FIG. 9B and the output of monostable multivibrator 59 becomes "1" as shown in FIG. 9C. Thus, the clamp pulse is derived through gate circuit 57 during only the above intervals and is then supplied to clamp circuit 52.

Consequently, the reproduced video signal is pedestal clamped in clamp circuit 52 without being disturbed by the guard band noise $N_G$.

The pedestal clamped reproduced video signal from clamp circuit 52 is fed to a code signal separator 60 in which the video signal is compared with a level higher than the pedestal level and, hence, the above inserted code signal is derived. This derived code signal is fed to a gate circuit 61.

The pedestal-clamped reproduced video signal from clamp circuit 52 is also applied to a synchronizing signal separator 62 from which the composite synchronizing signal is derived. This composite synchronizing signal is fed to a vertical synchronizing signal separator 63 from which the vertical synchronizing signal is derived. The composite vertical and synchronizing signals are supplied to a gate pulse generator 64 which produces a gate pulse and supplies the gate pulse to gate circuit 61. Thus, from the gate circuit 62 there are successively derived the VITC signals which are inserted in the above successive three horizontal line periods. The VITC signals in the three successive horizontal line periods are fed respectively, to three memories 65, 66 and 67 each of which is formed of, for example, of a shift register of 80 bits.

The composite synchronizing signal illustrated in FIG. 10A, produced at the output of synchronizing signal separator 62 is also supplied to a retriggerable monostable multivibrator which produces a pulse of narrow width as shown in FIG. 10B. This pulse of narrow width is fed to a gate circuit 69 which is supplied with the pulse illustrated in FIG. 10C from the PLL circuit 55. Thus, from gate circuit 69 there is derived a pulse of narrow width and the horizontal frequency $f_H$ as illustrated in FIG. 10D.

A variable frequency oscillator 7 supplies its output signal to a frequency divider of 71 which divides by 455. A phase comparator 72 is supplied with the output pulse of the horizontal frequency $f_H$ from the gate circuit 69 and with the frequency divided signal from frequency divider 71 and compares the phases of these signals. The compared error voltage from phase comparator 72 is supplied to the frequency control terminal of oscillator 70 to control its frequency such that the oscillation frequency is 455 times $f_H$, in other words $2f_{SC}$. Thus, the frequency of the frequency divided signal from frequency divider 71 will be $f_H$. The frequency divider 71 is formed in the same manner as frequency divider 14 as shown in FIG. 6 and produces at its other output terminal a clock pulse synchronized with the horizontal synchronizing pulse and of the frequency $f_B = \frac{1}{2} f_{SC}$.

The clock pulse having a frequency of $f_B$ is supplied to a timing pulse generator 75 which also receives the composite synchronizing signal from the synchronizing signal separator 62 and the pulse from the gate pulse generator 64 which pulse illustrates three horizontal line intervals where the VITC signals exist. Thus, timing pulse generator 75 supplies the timing pulse of 80 bits to memory 65 during the first horizontal line period of the three periods and to memory 66 during the next horizontal line period and to memory 67 during the third or last horizontal line period, and, thus, the VITC signals each consisting of 80 bits are written in the memories 65, 66 and 67 in a successive manner.

An oscillator 76 produces a clock pulse with a suitable frequency and supplies its output to a counter 77 which divides it in frequency by 4. The frequency divided signal from counter 77 is supplied to a timing pulse generator 78 which produces a timing pulse with the same frequency as that of the signal which is supplied to its input. This timing pulse is fed to a gate circuit 79 which also is supplied with the pulse from timing pulse generator 75 which timing pulse indicates that the storage in memories 65, 66 and 67 have been completed. Thus, the timing pulse from timing pulse generator 78 is gated through gate circuit 79 and supplied to memories 65, 66 and 67. In this manner, the VITC signals are successively written in three horizontal line periods on the memories 65, 66 and 67 and can be read simultaneously and successively in 80 bits groupings.

The VITC signals read out simultaneously from the memories 65, 66 and 67 are supplied to a code selector 80 and also to a coincidence detecting circuit 81. This coincidence detecting circuit 81 detects whether the respective bits of the 80 bits are coincidence among the three VITC signals or not and whether in the case that the respective bits are not coincident among three VITCs due to drop outs and for other reasons, two of coincident ones are "1" or "0". The detected output from the detecting circuit 81 is fed to code selector 80 to control it so that the code selector 80 delivers a correct VITC signal depending upon the coincidence or the decision based on a majority of the inputs in the memories 65, 66 and 67.

The correct VITC signal from code selector 80 is fed to a shift register 82 which consists of 4 bits. This shift register 82 is supplied with a clock pulse from oscillator 76 for the VITC signal which is to be written in shift register 82. The output of 4 bits from the shift register 82 is fed to a buffer memory 83 which receives timing pulses from the timing pulse generator 78 through the gate circuit 84 so that the VITC signal of 80 bits is transferred from the shift register 82 to buffer memory 83 4 bits by 4 bits.

The output from the buffer memory 83 are supplied to the display device 85 which then displays the address of the track $T_V$ which includes a rotary magnetic head that reproduces the signal indicative of the hour, minute, second and number of the frame of the track $T_V$.

In the case of a slow or still motion reproduction mode, a guard band noise will be caused in the reproduced video signal. In this case, the position at which the guard band noise appears in one field, is changed dependent upon the position of a scan trace to track $T_V$. That is when the scan trace takes place as shown by the dotted lines in FIG. 11 relative to the tracks $T_V$, no guard band noise is produced in the address signals $S_A$ inserted in the three horizontal line periods of the vertical blanking period but the guard band noises will be produced in the address signal $S_A$ when the scan trace has the position relative to tracks $T_V$ shown by the dotted lines in FIG. 12.

A pulse generator, (not shown) is provided in connection with the rotary shaft of the rotary magnetic head and a pulse is produced from the pulse generator when the head reaches a predetermined rotary angular position to give an index position. Also, if the head is rotated in synchronizm with the external synchronizing signal upon reproduction, the timing of the external synchronizing signal is also selected to be at the position where the head arrives at the predetermined angular position.

Figure 12:
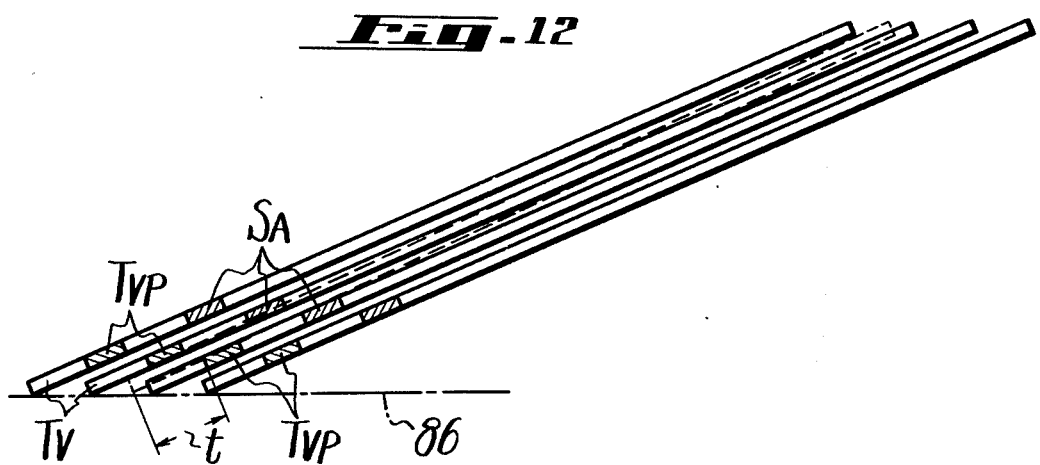
Figure 13:
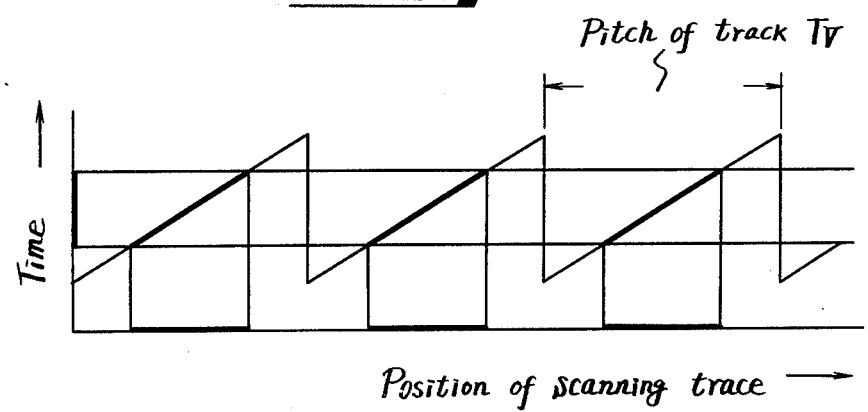

If it is assumed that the pulse from the pulse generator or external synchronizing signal is obtained at the time when the head reaches the position indicated by the one-dot chain line 86 in FIGS. 11 and 12, a time period t within which the head scans track $T_V$ from the position 86 to the vertical synchronizing pulse interval $T_{VP}$ is changed according to the position of the scan trace relative to the tracks $T_V$ illustrated in FIG. 13. Thus, between the position where the guard band noise is produced within one field and the time period t there is a correlation. Under such conditions that the guard band noise is not produced at the address signal $S_A$, the time period t falls within a constant range.

Relative to FIG. 7, the vertical synchronizing signal from the vertical synchronizing signal separator 63 is fed to a detector circuit 87 which is also supplied with the pulse from the above referenced pulse generator or the external synchronizing signal which is applied to a terminal 88 connected to the detector circuit 87. Thus, the detector circuit 87 detects whether the guard band noise is produced during the time period t in the address signal $S_A$ or not and supplies this detected information to timing pulse generator 75. Therefore, the timing pulse from timing pulse generator 75 is stopped by the output from the detector circuit 87 when the guard band noise is produced at output signal $S_A$ with the result that no VITC signal will be written into memories 65, 66 and 67 and the gate circuit 84 will be closed by the output of the detector circuit 87 so as to stop signal transfer from the shift register 82 to the buffer memory 83. This prevents an erroneous signal VITC signal from being read out during the guard band noise and displayed.

Due to construction of the recording apparatus of the present invention, since an address signal showing a video signal is recorded as a digital signal on the track of the video signal the digital signal corresponding to the address can be read out positively even in slow or still motion reproduction mode and, thus, editing of the video tape can be very efficiently carried out.

Also, in the invention, the synchronizing pulses and other pulses are not processed but the address signal is inserted in the horizontal line period between the horizontal synchronizing pulses within the vertical blanking period so that no undesirable influences are caused on signal processing such as clamping the video signal, separating the synchronizing signal and so forth and the reproduction will not be interfered with in any manner.

The bit freqency $f_B$ of the inserted VITC signal is selected to be a fraction of the subcarrier frequency $f_{SC}$ by an integer so that if the video signal with the VITC signal is routed through the time base corrector the reproduced video signal is written in the memory by the clock pulse whose frequency is higher than the color subcarrier frequency by an integer time and then the written signal is read out in the memory to correct its time base. Thus, the clock references are the same in number at every one bit of the address signal and the condition of the address code is not affected by the time base correction.

In the case where the same address signals are inserted in a plurality of horizontal line periods as shown in the Figures, and the decision based upon analyzing the majority of the outputs from the memories is used for reproduction, the probability that an erroneous reading caused by drop outs or other factors is greatly reduced.

In the above example, of the invention a signal which has a composition the same as that of the SMPTE time code is employed as the VITC signal. In such a signal, when the signal is reproduced from the tape during slow motion or still motion reproduction modes, the bit frequency $f_B$ varies by jitter. Therefore, there may be concern that all the bits cannot be read out correctly if the frequency of the clock pulse is maintained constant.

Another example of the invention will be described in which the VITC signal is modified from the SMPTE signal. In this example, a signal is employed which is provided by removing the sync words from the SMPTE time code and by adding synchronizing pulses thereto so as to read out the signal precisely and accurately.

FIG. 14 illustrates an example of the waveform of a modified VITC signal. In this modified VITC signal at the front and rear of each of the 8 time codes, each of which consists of 4 bits there are located synchronizing pulses $P_S$ which have a level higher than that of the VITC signal as illustrated in FIG. 14. The width of the synchronizing signal $P_S$ is selected to be equal to 1 bit of the time code and user bits. Accordingly, since 16 synchronizing pulses $P_S$ are used in the total the total number of bits of the VITC signal including the synchronizing pulses $P_S$ will be 80. In this example, the first synchronizing pulse $P_S$ will be positioned such that there is provided a constant $P_S$ between the horizontal synchronizing pulse $P_H$ and the first synchronizing pulse $P_S$.

In this modification, it is possible when reading the signal out that the clock pulse generator can be controlled by this synchronizing pulse signal $P_S$ so as to synchronize the oscillation phase of the clock pulse with the synchronizing signal $P_S$ at every 5 bits. Thus, even if the distance between the bits fluctuates, the deviation between the positions of each bit and the corresponding clock pulse will fall within a constant range and, hence, all of the bits can be precisely read out.

FIG. 15 illustrates apparatus for producing the VITC signal including synchronizing signals $P_S$ and inserts the VITC signal into a video signal and records the video signal including the VITC signal. In FIG. 15, an input terminal 101 receives a video signal which is to be recorded. The video signal applied to input terminal 101 is fed to an adder 102 and also to a synchronizing signal separator 103 from which the composite synchronizing signal containing the equalizing pulse is derived. The composite synchronizing signal is then fed to a frame pulse generator 104 which produces the frame pulse and supplies it to a time counter 105. The output from the time counter 105 is supplied to a buffer memory 106 as a time code. The user bits from a user bit generator 110 is supplied to buffer memory 106.

The composite synchronizing signal from synchronizing signal separator 103 is also fed to a monostable multivibrator 112 which produces the horizontal synchronizing pulse except for the equalizing pulse and supplies it to a phase comparator 115. A variable frequency oscillator 113 supplies its output signal to a frequency divider 114 which divides the applied signal by 455 and supplies the frequency divided signal to phase comparator 115. Thus, phase comparator 115 compares the horizontal synchronizing pulse from monostable multivibrator 113 with the phase of the frequency divided signal from frequency divider 114 and supplies the error voltage based on this comparison to variable frequency oscillator 113 to control the output frequency of the oscillator. Thus, the oscillation frequency of oscillator 113 will be 455 times $f_H$ or $2f_{SC}$ and the frequency of the frequency divided signal from frequency divider 114 will be $f_H$. The frequency divider 114 produces at a second output terminal a clock pulse which is synchronized with the horizontal synchronizing pulse and which has a frequency which is $f_B = \frac{1}{2}f_{SC}$. Since the frequency divider 114 can be the same as that illustrated in FIG. 6, its description is not repeated.

The clock pulse having a frequency of $f_B$ from the frequency divider 114 is supplied to a gate circuit 118. The composite synchronizing signal from the synchronizing signal separator 103 is also supplied to a vertical synchronizing signal separator 120 which produces the vertical synchronizing signal. The vertical synchronizing signal and the horizontal synchronizing pulse from monostable multivibrator 112 are supplied to a gate pulse generator 121 which produces a gate pulse and supplies it to gate circuit 118. Thus, the pulse having a frequency of $f_B$ is derived through gate circuit 118 in a video period of a predetermined horizontal line period within the vertical blanking period.

The pulse derived from gate circuit 118 is fed to a gate circuit 122. The pulse from gate pulse generator 121 comprising one horizontal line period into which the VITC signal is inserted and the output of suitable bits from frequency divider 114 are supplied to a synchronizing signal generator 123 which produces the synchronizing signal $P_S$ every 4 bits. This synchronizing signal $P_S$ is fed to a gate circuit 122 which then passes through the pulse with the frequency of $f_B$ during a period other than that when no synchronizing signal $P_S$ is present. The pulse from gate circuit 122 is fed to buffer memory 106 and the time code and user bits are derived in the arrangement illustrated in FIG. 14. The derived time and code and user bits are supplied to an adder 124 which also receives the synchronizing signal $P_S$ from synchronizing signal generator 123 and the signals are added together at twice the level of the level "1" of the time code.

The VITC signal from adder 124 which contains the synchronizing signals $P_S$ shown in FIG. 14 is fed to adder 102 and is added therein to the video signal. The composite video signal from adder 102 is supplied to a rotary magnetic head (now shown) and recorded by it as video tracks $T_V$ on a magnetic tape.

FIG. 16 is a schematic block diagram showing an example of the circuit of the invention which reads out the VITC signal inserted in the video signal recorded on the track $T_V$ and reads out this signal and displays the address of the video track $T_V$.

An input terminal 151 receives the reproduced video signal from a rotary magnetic head from a tape (not shown) upon which the video track is applied. The reproduced video signal is fed to a clamp circuit 152 which produces a vertical interval signal or composite synchronizing signal including the VITC signal and supplies it to a monostable multivibrator 154. The monostable multivibrator 154 derives the horizontal synchronizing pulse except the equalizing pulse which is fed to a phase synchronized circuit or so-called phase locked loop circuit PLL 155. Thus, the PLL circuit 155 produces a clamp pulse synchronized with the horizontal synchronizing pulse which is fed to the clamp circuit 152 to pedestal clamp the reproduced video signal.

The reproduced video signal which is clamped at the pedestal level from clamp circuit 152 is supplied to a gate circuit 158. The composite synchronizing signal from synchronizing signal separator 153 is then supplied to a vertical synchronizing signal separator 156 from which the vertical synchronizing signal is derived. This vertical synchronizing signal and the horizontal synchronizing pulse from monostable multivibrator 154 are fed to a gate pulse generator 157. The gate pulse derived from this gate pulse generator 157 is fed to a gate circuit 158 from which the VITC signal or address signal $S_A$ shown in FIG. 17A including the synchronizing signal $P_S$ inserted in the above determined horizontal line period is derived. This VITC signal $S_A$ is fed to a level comparator 161 and compared with a voltage $V_1$ which is higher than the pedestal level but lower than the level "1" of the time code and user bit. This level comparator 161 produces a pulse $P_E$ which is "1" at the position where the time code and user bits are "1" as illustrated in FIG. 17E. The level comparator 161 applies the pulse $P_E$ to a shift register 162 consisting of 5 bits.

The VITC signal $S_A$ from gate circuit 158 is also fed to another level comparator 163 and compared therein with a voltage $V_2$ which is higher than the level "1" of the time code and user bit but lower than the level of synchronizing signal $P_S$. The level comparator 163 then produces a pulse $P_B$ which becomes "1" only at the synchronizing signal $P_S$ as illustrated in FIG. 17B. The pulse $P_B$ is supplied to a monostable multivibrator 164 which produces a pulse $P_C$. Pulse $P_C$ rises in the up direction at a time later than the rise time of pulse $P_B$ by a constant period as can be observed in FIG. 17C. Pulse $P_C$ is fed to a clock pulse generator 165 which is formed from an oscillator, for example, which produces an oscillating signal at the fundamental frequency and a counter which frequency divides the oscillator signal in the oscillator of generator 165 and produces from its counter a clock pulse $P_D$ having the frequency of the above bit frequency $f_B$ as illustrated in FIG. 17D. The clock pulse $P_C$ is fed to the counter as its reset pulse so as to achieve control such that on the upward going portion of pulse $P_C$ coincides with the upward going pulse of the clock pulse $P_D$. Clock pulse $P_D$ is supplied to shift register 162 so that pulse $P_E$ from level comparator 161 is sampled at the time when pulse $P_D$ is rising upwardly and pulse $P_E$ is written in shift register 162.

Pulse $P_B$ from level comparator 163 is also supplied to a buffer memory 166 and also to a hexadecimal counter 167 which is reset by the horizontal synchronizing pulse from monostable multivibrator 154. The counted output from hexadecimal counter 167 is supplied to a timing pulse generator 168 which produces a timing pulse and supplies it to a buffer memory 166. Thus, the outputs of 5 bits from the shift register 162 except for the output corresponding to sychronizing signal $P_S$ or the outputs of 4 bits from shift register 162 are fed to memory 166 at different addresses at every synchronizing signal $P_S$ and are written in the memory. When all of the outputs from shift register 162 have been written into buffer memory 166 the output of memory 166 is fed to a display device 169. The display device 169 displays the address or track $T_V$ which is reproduced by the rotary magnetic head to indicate its frame number and its hour, minute and second identification.

In this case, even if the width of one bit of the VITC signal is fluctuating as described above, the phase of clock pulse $P_D$ will be synchronized every 5 bits with pulse $P_C$ based upon the synchronizing signal $P_S$. Therefore, deviations of the position of bits from the phase of clock pulse $P_D$ do not have to be retained and be integrated. Thus, the rising up positions indicating the time of clock pulse $P_D$ always fall within the width of the corresponding bit and an error read out is not produced.

In the above example, as the synchronizing signal $P_S$, there is employed a signal which has a level higher than those of the other signals but in place of the synchronizing signal, synchronizing bits may be used whose total bit number is greater than 80 and which consists of a number of 2 bits each "1" followed by "0".

According to the above example of the present invention, the synchronizing signal of the level which can be separated from the VITC signal is inserted in the VITC signal at every predetermined bit and then recorded so that by correcting the phase of the clock signal at every predetermined bit by utilizing the synchronizing signal upon read out the VITC signal are address signal can be read out precisely even if the bit frequency of the VITC signal varies by jitter, skew or other noise factors or by the variation of the horizontal frequency in a slow or still motion reproduction mode.

If the video signal including the above VITC signal is recorded on a magnetic tape, then even during slow or still motion reproduction modes the address of a reproduced picture can be identified. In fact, however, when the tape speed becomes higher than the normal speed, for example, more than twice the normal speed it is rather difficult to read out the VITC signal, although it is possible to read out the SMPTE time code signal recorded on the longitudinal track on the tape at high tape speeds. Therefore, if either one of the VITC signal and the SMPTE time code signals are automatically selected in response to the tape speed it becomes possible by selecting the corresponding signal as the function of the tape speed to decode and display the address of the reproduced picture accurately and pecisely. FIG. 18 illustrates an example of the invention which will selectively reproduce the VITC signal or the SMPTE time code signal depending upon the speed of the tape.

A magnetic tape 200 upon which a video signal in which the VITC signal has been inserted and the SMPTE time code signal has been applied and control track signals are recorded, respectively, as slant tracks and longitudinal tracks are provided. The video signal is reproduced by magnetic heads $H_A$ and $H_B$, the SMPTE time code signal is reproduced by magnetic head $H_Q$ from the longitudinal track and a control track signal is reproduced by a magnetic head $H_C$ from a longitudinal track. The reproduced video signal from heads $H_A$ and $H_B$ is fed to a demodulating circuit 201 and is converted into a video signal and delivered to an output terminal 202. The reproduced video signal from heads $H_A$ and $H_B$ is also fed to a VITC signal reading circuit 203 which then reads out the address signal and supplies it to one fixed contact S of a switching circuit 204. The reproduced SMPTE time code signal read by head $H_Q$ is fed to a SMPTE time code signal reading circuit 205 which also reads out the address signal and supplies it to the other fixed contact N of the switching circuit 204.

The control track signal reproduced by the magnetic head $H_C$ is fed to a tape speed detector 206 which detects the frequency of the reproduced control track signal. When the detected tape speed is higher than a predetermined speed as, for example, ¼ of the normal speed, tape speed detector 206 produces an output which is applied to switching circuit 204 so as to cause its moveable contact to move in contact with the fixed contact N and the moveable contact takes a position which is opposite to that illustrated in FIG. 18. The output from switching circuit 204 is fed to an address display device 207.

With the circuit shown in FIG. 18, when the actual tape speed is lower than the predetermined speed, the address display will be derived from the VITC signal while when the tape speed is higher than the predetermined speed the address display is achieved from the SMPTE time code signal.

In the example illustrated in FIG. 18, the actual tape speed is detected by reading the control track signal reproduced by the magnetic head $H_C$ but it is possible of course that instead of the control track signal derived by magnetic head $H_C$, the SMPTE time code signal reproduced by head $H_Q$ can be fed to a tape speed detector 206 as indicated by dotted line in FIG. 18 and the variation of the bit frequency of the SMPTE time code signal can be detected by detector 206 to detect the actual tape speed.

Also with such a video tape recorder in which the tape speed is controlled by a command signal, the command signal could be used to switch the switching circuit 204.

The above examples of the invention correspond to the cases in which the video signal of the NTSC system are utilized so that the bit frequency of the VITC signal is selected as 1/n $f_{SC}$ (n being an integer). However, when video signals of other systems such as PAL systems or other types are utilized, it is necessary to select the bit frequency of the VITC signal in view of the predetermined relationship to the horizontal frequency such that all bits of the VITC signal can be inserted in one horizontal line period as, for example, 455/4 $f_H$ horizontal line frequency.

Although the invention has been described with respect to preferred embodiments, it is to be realized that modifications and variations can be made by one skilled in the art without departing from the spirit and scope of the novel concepts of the invention as defined by the appended claims.

I claim as my invention:

1. A video signal reproducing system comprising:

(a) a tape,
(b) means for reproducing a video signal recorded on said tape, said video signal having a first address signal inserted in the vertical blanking period of said video signal,
(c) means for reproducing a second address signal recorded on a longitudinal track of said tape,
(d) means for selecting one of said first and second address signals, and
(e) means for controlling said selecting means corresponding to the moving speed of said tape.

2. A video signal reproducing system claimed in claim 1 which further includes means for displaying an address corresponding to said selected address signal.

3. A video signal reproducing system claimed in claim 1 wherein said controlling means includes means for detecting the frequency of said reproduced second address signal.

4. A video signal reproducing system claimed in claim 1 wherein a control signal is recorded on a longitudinal track of said tape, means provided for reproducing said control signal, and said controlling means includes means for detecting the frequency of said reproduced control signal.

5. A video signal reproducing system claimed in claim 1 wherein said first address signal is repeatedly inserted in one field or frame video signals.

6. A system claimed in claim 5 which includes means for reproducing said repeated first address signals and means for selecting a correct first address signal based upon comparing the correlation of said address signals.

* * * * *